United States Patent Office 2,845,360
Patented July 29, 1958

2,845,360

EXPLOSION RESISTANT REFRACTORY CASTABLE

Donald F. King and Albert L. Renkey, Pittsburgh, Pa., assignors to Harbison-Walker Refractories Company, Pittsburgh, Pa., a corporation of Pennsylvania No Drawing. Application December 11, 1956
Serial No. 627,567

3 Claims. (Cl. 106—104)

This invention relates to refractory castable compositions to be used in furnace construction that are capable of withstanding high temperatures and which are applied by pouring, ramming, tamping, or gunning to form monolithic structures.

With the discovery, several decades ago, of monocalcium aluminate cements used in conjunction with various refractory aggregates as a protective refractory for industrial furnaces, a new art developed. Essentially the art was that of constructing industrial furnaces and the like from refractory concretes by casting or pouring techniques. The new refractory mixtures became known as refractory castables. Ordinarily either the entire raw batch or the separate ingredients are shipped dry to the point of use, whereupon water is added and refractory structures are then made on the job site as by casting the desired structure.

The first refractory calcium aluminate cement compositions developed were effective up to temperatures of about 2700° F. Subsequent developments, primarily directed to the cements per se, have extended the useful temperature range of those compositions to as much as 3000° F. and even higher. These developments have involved the reduction of the content of auxiliary oxides in the cements, other than lime and alumina, to the commercially feasible minimum and have also involved the use of various procedural steps in the production of the cements to obtain a product of relatively low lime content. Other refinements that have been employed to extend the operating range of the resultant monolithic refractories have involved the careful selection of the aggregate and the minimizing of the quantity of cement in the final composition. This latter device has been dictated by the fluxing effect which the lime-containing cement has on the mixture.

As the stronger castables, which are useful in the higher temperature range, have been used for a period sufficient to develop experience with them, it has been established that they are characterized by a generic defect. This defect is a propensity of the compositions to explode when first heated.

It will be realized that the chief appeal of refractory castables to furnace builders is one of time saving. The mode of installation commonly is one of pouring, ramming, tamping, or gunning; consequently, large sections can be made or cast at one time. On the other hand, a heating period consuming an extended period of time to eliminate the tendency to explode may mitigate the time advantage inherent in this method of applying the refractory. Moreover, the use of careful curing or drying procedures, while possibly decreasing the tendency of explosion to some extent, has not been entirely satisfactory as a solution to that problem. By way of example, an alumina-silica castable, bonded with the high alumina, calcium aluminate cement, used to cast an electric furnace roof was dried by standing in air for two weeks. This drying was accomplished without induced heat and was considered to be an ideal curing procedure. After drying, the roof was lifted into place on the furnace and heat applied. It promptly proceeded to spall itself to pieces by a series of explosions even before the desired steel melting temperature was reached. In another instance a similar castable produced with the same type of calcium aluminate cement was used to construct a burner hood for a rotary chemical drier. Upon lighting the burner, an explosion occurred within the cast refractory. The explosion was so violent that the large steel structure housing the hood was blown horizontally 25 to 30 feet with tremendous violence. Obviously it would be a boon to this art if a simple method of avoiding these hazards were to be developed.

It is a major object of this invention to provide a castable refractory composition that contains a calcium aluminate cement having an $Al_2O_3$ to CaO ratio of at least 2 to 1 by weight that resists explosion heretofore common with these compositions.

It is a further object to produce a non-explosive castable refractory composition according to the foregoing object simply, inexpensively, and in a manner requiring no material changes in existing production procedures.

We have discovered, and it is upon this that the present invention is in a large part predicated, that the addition of a small amount of boric acid to an otherwise explodable refractory composition that contains a calcium aluminate cement having an $Al_2O_3$ to CaO ratio of about 2:1 to 6:1 by weight will provide a resulting composition that will not explode upon heating. As a consequence of this discovery, refractory castables, that do not have the explosion tendencies of castables heretofore formed by using the described high alumina type of calcium aluminate cements, can be produced simply and inexpensively, and after installation may be heated rapidly to operating temperatures without the dangers hereinbefore described.

In accordance with this invention, castable refractory compositions are prepared by incorporating in a base composition, which consists essentially of a heat-explodable mixture of aggregate and a calcium aluminate cement which has the requisite $Al_2O_3$ to CaO ratio, a small amount of boric acid effective to inhibit the explosive characteristics of the mixture. More specifically, compositions of this invention comprise at least a major proportion of refractory aggregate, a minor proportion of the described cement, for example 10 to 50 percent by weight, and an amount of boric acid sufficient to inhibit the explosive characteristics of the base mixture. Other materials such as plasticizers, set regulators, and the like, used in similar or related base compositions may be present if desired. Typical materials that are included in known refractory castables are set regulators such, for example, as water-soluble organic acids or their soluble salts, such as oxalic acid, citric acid, sodium citrate, and so on. Such materials may be used in the quantities that are now conventional provided they do not deleteriously affect the explosion-resistant characteristics of the resultant boric acid-containing castable or otherwise militate against use of the resultant composition as a refractory castable.

The optimum quantity of boric acid that is to be employed in this invention is dependent upon the particular aggregate used in addition to the quantity of cement and its $Al_2O_3$ to CaO ratio. We have found that as little as 0.02 percent by weight of boric acid, based on the resulting refractory composition, is effective for the described purposes. We have also used as much as 1.5 percent of boric acid satisfactorily. While larger amounts may be used, such greater amounts do not usually warrant the additional expense. Based on the cement alone, a suitable range of boric acid is about 0.002 to 0.03 part of the acid per part of cement.

As pointed out above, the hydraulic cements used in this invention are calcium aluminate cements having an $Al_2O_3$ to $CaO$ ratio of at least about 2:1 by weight. These cements are available commercially and are additionally characterized by high purity and high refractoriness. Refractory castables supplied in accordance with this invention by use of these cements may have a useful temperature range extending to 3000° F. and even higher.

The refractory aggregates useful in this invention are those which in conjunction with the described cements form a refractory mixture that will, apart from this invention, explode when initially heated rapidly to elevated temperatures of the order of, say 2000° F. to 3000° F. Typical aggregates of this nature include, by way of example, calcined or fused alumina, calcined bauxite or diaspore, aluminum silicate aggregates such as calcined clay, calcined kaolin and ground fireclay brick and high alumina brick, and lightweight or insulating aggregates such as perlite. As a group these may be spoken of as alumina-silica aggregates. In addition to aggregates such as the foregoing, there may be included other aggregates commonly included in these compositions. We have found that small amounts of uncalcined clay, or other refractory materials, do not lessen the explosion hazard nor interfere with the advantages attending the inclusion of boric acid. All aggregates are used in the conventional manner; that is, the aggregates are used in a variety of sizes determined to yield satisfactory density and strength in the resultant product.

As illustrating the invention, a refractory castable composition was prepared from calcined flint clay, ball clay and calcium aluminate cement. The ball clay and cement, which were of fine grain size that would pass a 65-mesh screen, were intimately admixed with the calcined flint clay which had been ground and screened to provide appropriate grain sizes. A wet screen analysis of the resultant mixture was as follows:

| | | Percent |
|---|---|---|
| −3 | + 4 mesh | 5 |
| −4 | +10 mesh | 35 |
| −10 | +28 mesh | 15 |
| −28 | +65 mesh | 10 |
| −65 | mesh | 35 |

Boric acid was added to the mixture which was thoroughly agitated to insure uniformity of the mixture. These components were used in the following proportions, by weight:

| | Percent |
|---|---|
| Calcined flint clay | 83 |
| Ball clay | 2 |
| Cement | 14.85 |
| Boric acid | 0.15 |

The calcium aluminate cement used was purchased in the commercial market and was believed to contain about one percent of sodium citrate as a set regulator. The $Al_2O_3$ to $CaO$ ratio of this cement was 4.4 to 1 by weight.

To test the foregoing composition for explosion tendencies, water was added thereto until a suitable ramming consistency developed. A block was then formed from the mixture with the dimensions, in inches, of 18 x 18 x 9. The block was air-dried over night, after which it was installed with an 18 x 18 inch face flush against the doorway of a gas-fired test furnace. Heat was then applied and at a rate such that a temperature of 2550° F. was attained in two hours because it had been determined that these conditions were as severe as any that would likely be encountered in commercial practice. No explosions occurred, and the cast block maintained its form without any deterioration. It thus gave evidence, later fully substantiated by experience in furnace walls, that this composition would be a refractory product of great usefulness. On the other hand, when the same test was run on a castable mix, which was identical except for the omission of boric acid, the panel exploded and the face blew off to a depth of an inch or more before the temperature of 2550° F. was reached.

These results show that the addition of a small amount of boric acid will eliminate the explosion characteristics of a refractory composition that contains the described aggregates and cements. Other tests have confirmed these data. It will be appreciated that these same results may be achieved by adding the boric acid to the aggregate or cement rather than directly to a mixture of aggregate and cement.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. An explosion resistant refractory castable consisting essentially of refractory aggregate selected from the group consisting of alumina and alumina silica aggregate and a high alumina, calcium aluminate cement which has an $Al_2O_3$ to $CaO$ ratio of about 2:1 to 6:1 by weight and containing boric acid in an amount of about 0.02 to 1.5 percent based on the weight of the mixture.

2. A hydraulic cement for use in conjunction with refractory aggregate to produce a refractory castable, which consists essentially of calcium aluminate cement having an $Al_2O_3$ to $CaO$ ratio of about 2:1 to 6:1 by weight and boric acid, said boric acid being present in an amount of about 0.002 to 0.03 part for each part of cement.

3. That method of inhibiting the explosion tendencies of a refractory castable composition which consists essentially of refractory aggregate selected from the group consisting of alumina and alumina silica aggregate and a calcium aluminate cement which has an $Al_2O_3$ to $CaO$ ratio of about 2:1 to 6:1 by weight, which comprises incorporating in said composition boric acid in an amount of about 0.02 to 1.5 percent based on the weight of solids in said composition.

References Cited in the file of this patent

UNITED STATES PATENTS

| 2,516,892 | Lobaugh | Aug. 1, 1950 |
| 2,684,913 | West | July 27, 1954 |